US012570423B2

(12) United States Patent
Vollenkemper

(10) Patent No.: US 12,570,423 B2
(45) Date of Patent: Mar. 10, 2026

(54) BAG MANUFACTURING APPARATUS AND METHOD

(71) Applicant: HAVER & BOECKER OHG, Oelde (DE)

(72) Inventor: Willi Vollenkemper, Oelde (DE)

(73) Assignee: HAVER & BOECKER OHG, Oelde (DE)

( * ) Notice: Subject to any disclaimer, the term of this patent is extended or adjusted under 35 U.S.C. 154(b) by 44 days.

(21) Appl. No.: 18/118,347

(22) Filed: Mar. 7, 2023

(65) Prior Publication Data

US 2023/0249861 A1 Aug. 10, 2023

Related U.S. Application Data

(62) Division of application No. 16/466,504, filed as application No. PCT/EP2017/082003 on Dec. 8, 2017, now Pat. No. 11,643,234.

(30) Foreign Application Priority Data

Dec. 8, 2016 (DE) ......................... 102016123805.8

(51) Int. Cl.
*B65B 43/04* (2006.01)
*B31B 50/16* (2017.01)
(Continued)

(52) U.S. Cl.
CPC .............. *B65B 43/04* (2013.01); *B31B 50/16* (2017.08); *B65B 1/02* (2013.01); *B65B 1/04* (2013.01);
(Continued)

(58) Field of Classification Search
CPC ........... B31B 50/16; B65B 43/04; B65B 1/02; B65B 1/04; B65B 41/12; B65B 51/30; B65B 61/005
(Continued)

(56) References Cited

U.S. PATENT DOCUMENTS 4,101,363 A 7/1978 Lotto
4,355,494 A * 10/1982 Tilman ................ B29C 66/4322 53/139.2
(Continued)

FOREIGN PATENT DOCUMENTS

CN 1915658 2/2007
CN 102574353 7/2012
(Continued)

OTHER PUBLICATIONS

Canadian Office action issued Jul. 15, 2025, 3 pages.

*Primary Examiner* — Sameh Tawfik
(74) *Attorney, Agent, or Firm* — CHRISMAN GALLO TOCHTROP LLC

(57) ABSTRACT

Apparatus and method of manufacturing open-mouth bags, comprising a storage device with a supply of bag film, a control device for controlling, a conveying device for conveying the bag film and/or the bag body along a conveying path, a welding device with welding means for making a bottom seam in the bag film and a cutting device with a cutting means for separating a predetermined film length of the bag film to form the bag body of an open-mouth bag. The control device controls the conveying device so as to cause a relative motion of the bag body and the bag film and a distance between the bag body and the bag film is generated prior to making the bottom seam. The control device controls the conveying device and the welding means so that while welding the bottom seam the welding means extend at least up to the bottom end of the bag body.

15 Claims, 4 Drawing Sheets

(51) Int. Cl.

| | |
|---|---|
| ***B65B 1/02*** | (2006.01) |
| ***B65B 1/04*** | (2006.01) |
| ***B65B 41/12*** | (2006.01) |
| ***B65B 51/30*** | (2006.01) |
| ***B65B 61/00*** | (2006.01) |
| ***B65D 30/20*** | (2006.01) |

(52) U.S. Cl.
CPC .............. *B65B 41/12* (2013.01); *B65B 51/30* (2013.01); *B65B 61/005* (2013.01); *B65D 31/10* (2013.01)

(58) Field of Classification Search
USPC .......................................................... 493/199
See application file for complete search history.

(56) References Cited

U.S. PATENT DOCUMENTS 4,401,213 A * 8/1983 Lerner ................... B65D 81/24 206/390
4,449,962 A 5/1984 Copia
4,546,596 A 10/1985 Cherney
4,550,831 A * 11/1985 Whitford .................. A61L 2/20 383/41
4,617,683 A * 10/1986 Christoff ............. B29C 66/4322 53/139.2
4,709,398 A * 11/1987 Ausnit ................. B65D 33/002 53/139.2
4,876,842 A * 10/1989 Ausnit ................ B29C 66/4322 53/64
5,041,070 A 8/1991 Blaser
5,118,202 A * 6/1992 Bruno ................ B65D 75/5805 383/203
5,127,208 A * 7/1992 Custer ................... B29C 66/346 493/212
5,247,781 A * 9/1993 Runge ................... B65B 61/188 53/139.2
5,626,004 A * 5/1997 Gates ...................... B65B 37/02 53/469
5,823,933 A * 10/1998 Yeager ................. B65D 33/002 493/213
6,550,225 B1 4/2003 Cahill et al.
7,093,978 B2 * 8/2006 Tan ......................... B31B 70/00 383/120
7,794,380 B2 * 9/2010 Baker ................ B65D 33/2533 493/212
8,070,359 B2 * 12/2011 Taheri ................. B29C 66/1122 383/105
9,150,315 B2 10/2015 Vollenkemper
10,745,227 B1 8/2020 Hill
11,643,234 B2 5/2023 Vollenkemper
2006/0222430 A1 10/2006 Duckett et al.
2008/0300121 A1 12/2008 Selle et al.
2012/0096815 A1 4/2012 Vollenkemper
2016/0194103 A1 7/2016 Shimoda et al.
2018/0056599 A1 3/2018 Selle et al.

FOREIGN PATENT DOCUMENTS

| | | |
|---|---|---|
| CN | 104691804 | 6/2015 |
| CN | 104985864 | 10/2015 |
| CN | 105415747 | 3/2016 |
| CN | 106182892 | 12/2016 |
| DE | 2459725 | 7/1976 |
| DE | 3515846 | 11/1985 |
| DE | 102010049369 | 4/2012 |
| DE | 10039105 | 2/2020 |
| EP | 0844070 | 5/1998 |
| EP | 3551446 | 7/2023 |
| WO | 2011037528 | 3/2011 |
| WO | 2018104515 | 6/2018 |

* cited by examiner

BAG MANUFACTURING APPARATUS AND METHOD

FIELD OF THE INVENTION

The present invention relates to a bag manufacturing apparatus and a method of manufacturing open-mouth bags and to open-mouth bags manufactured thereby. Such a bag manufacturing apparatus is in particular used with or for an FFS system (Form-Fill-Seal) for on-site manufacture of the open-mouth bags required for filling bulk goods into open-mouth bags. It is also possible for the bag manufacturing apparatus according to the invention to produce bag supplies for intermediate storage for later use.

DESCRIPTION OF RELATED ART

In particular foodstuffs are filled into the manufactured open-mouth bags. Particularly preferably powdery foodstuffs such as powdered milk, dextrose, starch etc. are filled into the open-mouth bags. The bagging of foodstuffs and in particular baby food requires a high level of hygienic standards. Any bags filled with foodstuffs should prohibit adhesion of dirt particles save for the smallest amount possible.

For manufacturing open-mouth bags tubular sheets tend to be used which are conveyed in one conveying direction. First a bottom seam is made in the tubular sheet in a bottom seam welding station. Thereafter the tubular sheet is indexed further one bag length and the next bottom seam is made in the tubular sheet while the tubular sheet is cut just beneath the bottom seam so that the first open-mouth bag is made. Thereafter the open-mouth bag is filled from above with product and a welding device welds the head end shut. Although the method is basically functional its drawback is that the bottom seam shows at least some excess film length. The two layers of the excess film length together form takeup space or a number of takeup spaces or hollow spaces at or in which dirt particles or the filled product can collect so that the hygiene conditions are less than perfect.

Such an excess film length might be eliminated by a product-proof margin weld in the bottom seam. Attempting to cut off the film immediately next to the weld seam will in many cases result in sealing the head end of the preceding open-mouth bag or in (a short) excess film length remaining at the bottom seam. Although it is basically conceivable to cut off the excess film length at the bottom seam subsequently, the minor overhangs make implementing automatic processes difficult or the film consumption increases considerably. Moreover this would generate tailings involving complex disposal thereof.

Another possibility is to employ a second bottom seam welding station in addition to the first bottom seam welding station following in the conveying direction for welding the excess film lengths together. However, this considerably increases the overhead and additionally decreases the system performance.

SUMMARY OF THE INVENTION

It is therefore the object of the present invention to provide a bag manufacturing apparatus and a method of manufacturing open-mouth bags, and open-mouth bags manufactured thereby, by means of which improved hygiene in manufacturing open-mouth bags is possible.

This object is solved by a bag manufacturing apparatus having the features described herein and by a method having the features described herein. The open-mouth bag according to the invention is the subject matter of the disclosure herein. Preferred specific embodiments of the invention are the subjects of the claims herein. Further advantages and features of the present invention can be taken from the general description and the description of the exemplary embodiments.

The bag manufacturing apparatus according to the invention serves to manufacture open-mouth bags and comprises a storage device with a supply of bag film. A control device serves for controlling. Furthermore at least one conveying device for conveying the bag film and/or the bag body along a (pre-defined) conveying path is provided. There is provided (at least) one welding device with welding means for making (at least) one bottom seam in the bag film. Furthermore (at least) one cutting device having (at least) one cutting means is provided for separating a predetermined length of the bag film to form the bag body of an open-mouth bag. The control device is set up and configured to control the conveying device so as to cause relative motion of the bag body relative to the bag film and prior to making the bottom seam, to create a distance between the bag body and the bag film. The control device is set up and configured to control the conveying device and the welding means such that while welding the (product-proof margin of the) bottom seam, the welding means extend at least up to the bottom end of the bag body and/or beyond.

At least while the bag film is being cut it is possible and preferred for the cutting means to be disposed and effective within a longitudinal section of the conveying path in which (longitudinal section) the welding means are disposed and effective during the welding.

The bag manufacturing apparatus according to the invention has many advantages. A considerable advantage of the bag manufacturing apparatus according to the invention consists in the fact that while the bottom seam is being welded the welding means extend at least up to the bottom end of the bag body. This may be ensured by way of the cutting means being positioned in the same longitudinal section as are the welding means during the cutting.

The or at least one conveying device ensures that during the welding a distance is provided between the bag body and the bag film to prevent the leading edge of the bag film from being welded together. The bag film is preferably moved rearwardly to establish the (predetermined) distance after cutting and prior to welding.

The cutting device and the welding device are in particular disposed and effective in an overlapping longitudinal section of the conveying path. In all the configurations a product-proof margin weld is preferably achieved. This can be ensured by having the welding means protrude beyond the end of the film to thus weld the film up to the bottom end and including the bottom end.

The bag body is in particular welded full-surface within the bottom seam up to the bottom end. Then there will be no two protruding film layers at and between which dust may accumulate. This is how a weld seam absent an outwardly excess film length is generated.

To set a (defined and/or predetermined) distance the (separated) bag body may also be conveyed further by the (predetermined) distance (along the conveying path) relative to the bag film while the bag film is e.g. not advanced. Then the bag body is advanced by the predetermined distance until the bottom end reaches the welding means and in welding, a product-proof margin weld of the bottom seam or a full-surface bottom seam is generated extending up to the bottom end of the bag body.

A relative motion of the bag body relative to the bag film prior to making the bottom seam generates the desired distance between the bag body and the bag film. This free distance is large enough so as to not weld the leading edge of the bag film. The distance is in particular longer than 2 mm and preferably longer than 5 mm or 10 mm. The distance may be longer, measuring e.g. 15 mm or 20 mm or 30 mm or 300 mm or 500 mm or more. The distance is basically arbitrary as long as it is ensured that the welding means weld the bottom end completely up to the margin.

Preferably the welding device comprises welding jaws and in particular a pair of welding jaws acting as welding means. The welding jaws preferably extend transverse across the bag film and in particular beyond and outwardly to both sides.

Preferably (at least) one fixing means is provided for fixing the bag film to the conveying path in front of the longitudinal section. In particular (at least) one fixing means is provided for fixing the bag film to the conveying path following the longitudinal section. Such a fixing means may be formed for example by a tube or a profile section. The profile or tube may for example be provided with a rubber covering or the like for securely fixing the bag film. The fixing means may apply spot fixing for the bag film. It is possible and preferred for the fixing means to fix the bag film in lines or planes so as to also prohibit any or every (even slight) local displacement of the bag film.

Preferably the longitudinal section is defined by the length of the welding means along the conveying path or in the conveying direction. Preferably the two welding means are substantially identical or mirror-symmetrical or centrosymmetrical in structure. Preferably the two welding means show at least substantially the same dimensions. Alternately it is possible for the two welding means to show different lengths in the direction of the conveying path. Then the longitudinal section is defined by the shorter length of the two welding means respectively by the overlapping length of the two welding means.

In all the configurations it is preferred for the longitudinal section to extend over a length of more than 5 mm or more than 10 mm. The longitudinal section may in particular extend over a length between 2 mm and 50 mm and preferably between 5 mm and 30 mm. The length of the longitudinal section depends in particular on the dimensions of the open-mouth bag.

In particularly preferred configurations the welding means extend (in the longitudinal direction of the bag film) beyond the bottom end of the bag body during the welding. This enables and ensures a product-proof margin weld of the bottom end of the bag body. This reliably prevents excess film lengths at the bottom seam.

Preferably the seam length of the bottom seam is shorter than the longitudinal section. Seam lengths between 2 mm and 15 mm and in particular between 3 mm and 10 mm are particularly preferred. In the case of large open-mouth bags the seam length may be longer.

In all the configurations it is preferred for the bag film to be configured as a tubular sheet and for the storage device to comprise an accommodation for (at least) one film roll and in particular a tubular film roll. It is also conceivable to manufacture the open-mouth bags from a sheet of film which is folded over and provided with a longitudinal weld.

In all the configurations it is possible for the bag manufacturing apparatus to comprise at least one corner seam welding device for making corner seams in the bag film so as to obtain block-shaped filled bags. A corner seam welding device may also be omitted or film rolls with prefabricated corner welds may be used.

In all the configurations it is preferred for the bag manufacturing apparatus to comprise at least one film supply including a traversable or pivot-mounted tensioning roll. It is also possible to provide two or more tensioning rolls. The tensioning roll or the tensioning rolls may be pre-tensioned by a weight or a spring or the like. The film supply may compensate for part of a bag length or one bag length or more to enable a partially continuous operation or a continuous operation or a continuous rotation of the film roll or roll of tubing at the storage device. It is also possible and preferred to operate the film roll (roll of tubing) indexed and to rotate it a certain amount for each single open-mouth bag.

In preferred specific embodiments an appending device is comprised for appending an open-mouth bag to a filling spout of a filling system. It is also possible to provide two or more appending devices.

The method according to the invention serves to manufacture open-mouth bags from a supply of bag film, the bag film being transported along a conveying path and (at least) one cutting means of a cutting device separating a predetermined film length from the bag film to form the bag body of an open-mouth bag. The bag film is moved relative to the bag body. A bottom seam up to the bottom end of the bag body is made by welding to form an open-mouth bag.

The method according to the invention also has many advantages. The method allows to manufacture open-mouth bags meeting highest hygienic standards.

Preferably the bag film is retracted from the separated bag body in particular a defined distance prior to welding the bottom end. It is also possible for the bag film to be retracted from the separated bag body an undefined distance for example by activating the pertaining drive for a specific time period or the like. Later, when the bag film is conveyed further for example an optical sensor or the like may detect the leading edge of the bag film, thus allowing defined positioning of the bag film leading edge.

Retracting the bag film from the separated bag body allows to ensure a product-proof margin weld of the bottom seam while concurrently ensuring that the leading edge of the bag film, which forms the head end of the next open-mouth bag, is not welded shut.

In preferred specific embodiments the film or the bag body is fixed in place prior to separating the bag body. The bag film is in particular fixed in the region of the bag body and so is the bag film in front. Such fixing may be done for example by pressing suitable fixing means or a tube or a rail or the like on the bag film from above so as to hold the bag film in a defined place. Then there will be no undesirable displacement of the bag body when separating the bag body or the bag film.

The fixing of the bag film in front of the bag body is preferably removed prior to retracting the bag film. The bag body remains in particular fixed while the bag film is being retracted.

Preferably the welding means reach at least up to the bottom end of the bag body during the welding. The welding means in particular protrude beyond the bottom end of the bag body during the welding.

The bottom seam of the bag body is in particular welded showing a product-proof margin up to the bottom end. Welding is preferably done over the full surface inside the bottom seam.

In all the configurations it is preferred to first separate the bag body and then to make the bottom seam.

An open-mouth bag according to the invention is manufactured by means of any of the methods described above and comprises a bag body at least partially consisting of a bag film wherein a bottom seam closes the bottom end of the bag body. The open-mouth bag may in particular comprise a weld seam (extending up to the bottom end) having a product-proof margin at the bottom seam. A bag filled with bulk material and closed at its head end may likewise show a product-proof top seam.

In all the configurations the bag body of the open-mouth bag may comprise gussets and/or corner welds.

On the whole the invention provides an advantageous bag manufacturing apparatus, an advantageous method, and advantageous open-mouth bags, so as to enable hygienic filling of bulk goods and in particular powdery foodstuffs into open-mouth bags. The finished open-mouth bags do not show any excess film lengths at the bottom seams where particles or dirt might adhere.

During manufacture the film of the bag film is advanced up to about one bag length beyond the cutting level of the cutting device. This is where the fixing means, which are for example configured as pressing bars, are lowered. Thereafter the cutting device cuts the bag body off the bag film. Then the fixing means or pressing bar resting against the bag film is released while the other of the pressing bars continues to fix the bag body. Thereafter the bag film is retracted somewhat, far enough so that the leading edge of the bag film leaves the active zone of the welding device for the bottom seam. The retracted bag film length is temporarily stored in the film supply. Thereafter the bottom seam is welded with the welding means entirely covering the bottom end and protruding some distance so as to provide a product-proof margin weld of the bottom seam up to the extreme end. This means that the film layers lying on top of one another are completely welded to one another up to their extreme ends.

The finished bag body is transported further with the open side leading in the conveying direction of the conveying path. The bag film is thereafter advanced again so that a (new) bag body is once again positioned completely in front of the cutting level. The bag film may be advanced for example sensor-controlled or for example by means of a servo drive or the like so as to enable precisely defined positioning of the bag film.

The bag manufacturing apparatus may comprise a film supply so as to enable continuous operation of the film roll or roll of tubing. Alternately it is possible to provide for start/stop operation of the film roll or the roll of tubing.

Further advantages and features of the present invention will now be described with reference to the exemplary embodiment which will be discussed below with reference to the enclosed figures.

DETAILED DESCRIPTION OF PREFERRED EMBODIMENTS OF THE INVENTION

Figure 1:
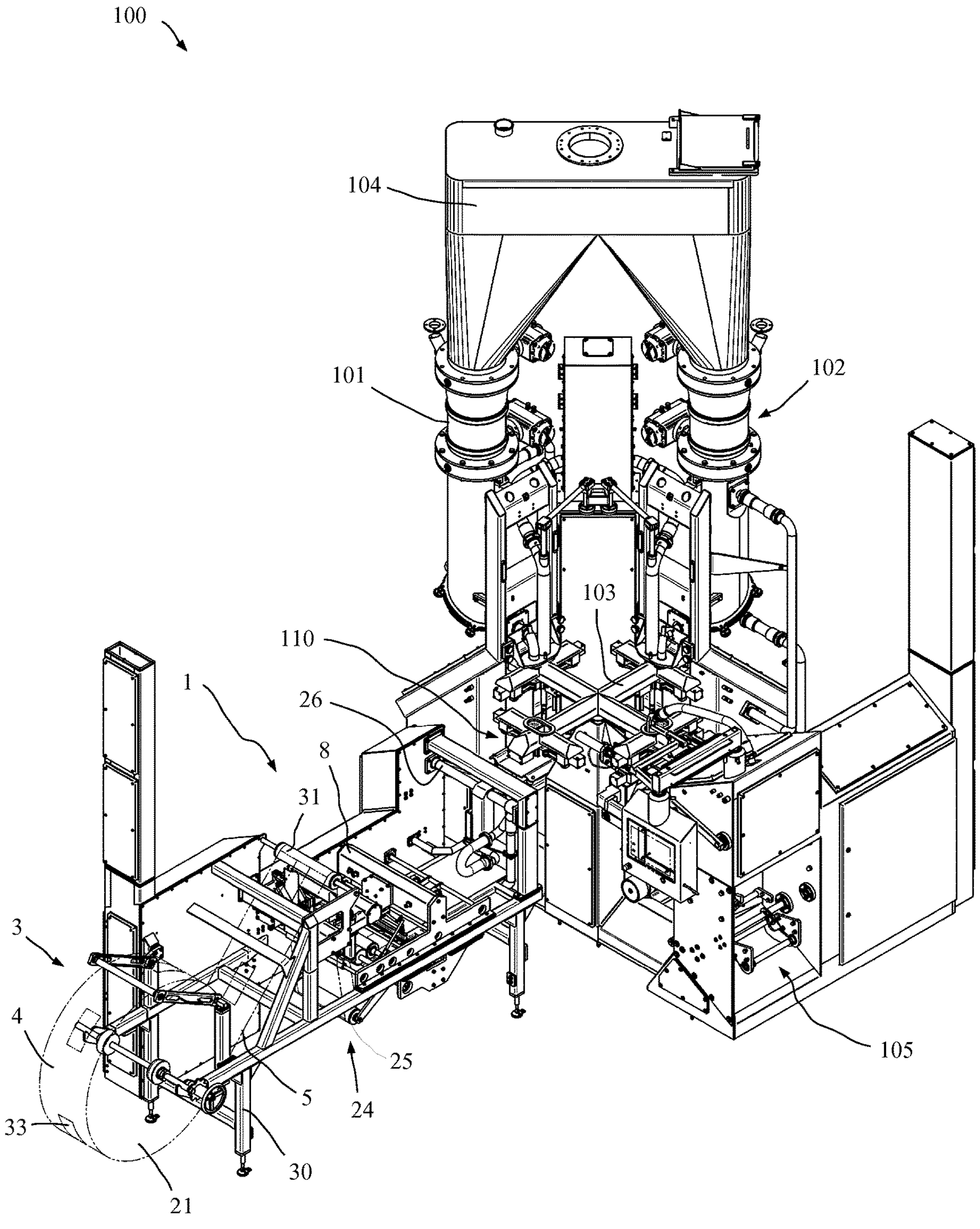
FIG. 1 a schematic perspective view of a filling system of the bag manufacturing apparatus according to the invention.

FIG. 1 shows a schematic perspective illustration of a filling system 100 comprising a dispensing silo 104 and a high speed flow 101 and a low speed flow 102 for filling bulk goods and in particular powdery foodstuffs into open-mouth bags.

The filling system 100 comprises a bag manufacturing apparatus 1. The bag manufacturing apparatus 1 is installed upstream of the filling proper and manufactures, from a film roll or presently a roll of tubing 21 with a rolled-up bag film 5, single open-mouth bags 2 (see FIG. 4) which, after appending by means of the appending device 26, are filled with the intended filled bulk material via the filling spout 110 of the filling system 100.

The filling system comprises rotary filling spouts 110 which rotate indexed to each of the stations. After appending to a first filling spout the next station performs high speed flow filling followed by indexing further for low speed flow filling. Both the high speed flow filling station and the low speed flow filling station are provided with at least one compacting device each for compacting the bulk material in the open-mouth bag already during the filling process. In the fourth station the bag is conveyed off at the bag removal 105.

The bag manufacturing apparatus 1 comprises a frame 30 where a storage device 3 with the supply 4 is disposed as well. This supply 4 consists of the roll of tubing 21 on which the bag film 5, presently a tubular sheet, is kept rolled up. The tubular sheet 5 is transported along the conveying path 7 by means of at least one conveying device 6. In simple cases the conveying device consists of one or two driven transport rollers for controlled transporting of the tubular sheet along the conveying path 7.

Figure 4:
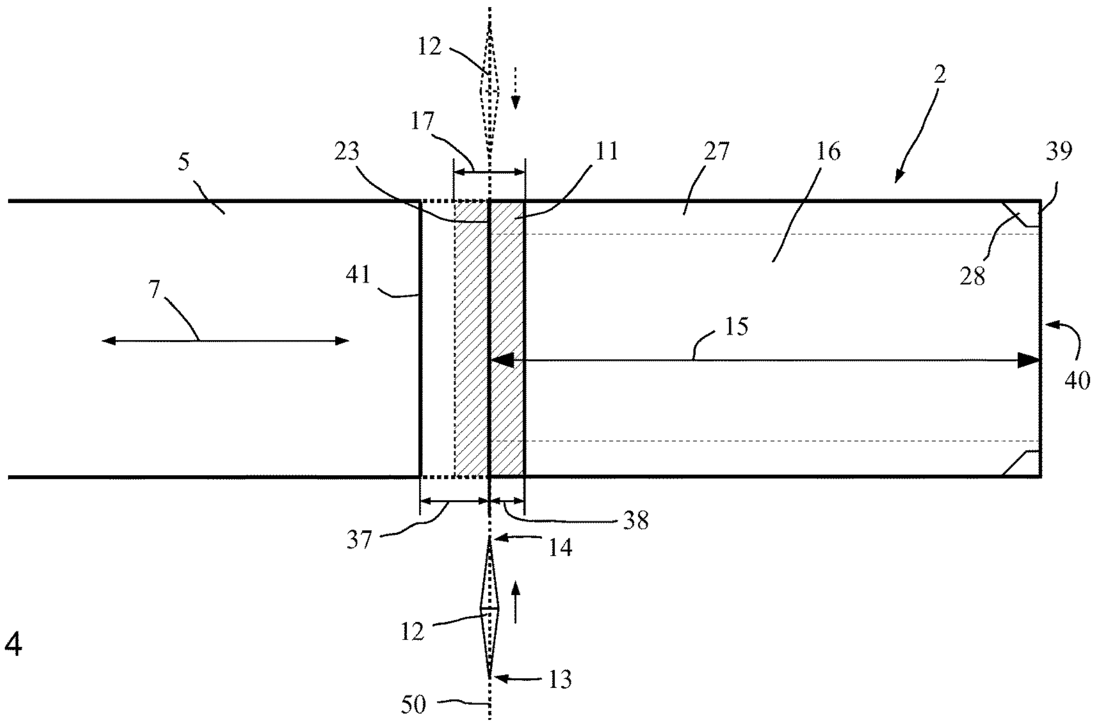
FIG. 4 a schematic plan view of the bag film.

A corner seam welding device 22 may be provided to insert corner welds 28 in the tubular sheet which provide a block-shaped filled bag in the filled bag in conjunction with the gussets 27 (see FIG. 4).

Deflection rollers 31 serve to deflect the bag film 5. A film supply 24 which presently comprises a pivoting tensioning roll 25 serves for longitudinal compensation of different bag lengths manufactured by the bag manufacturing apparatus 1. Optionally the film supply 24 may comprise a number of tensioning rolls 25 so as to enable a continuous rotation of the roll of tubing 21 while the open-mouth bag 2 is manufactured in the bag manufacturing apparatus 1. At any rate the film length retracted prior to welding may be temporarily stored in the film supply.

The welding device 8 shown makes the bottom seam 11 in the bag body 16 shown in FIG. 4.

Figure 2:
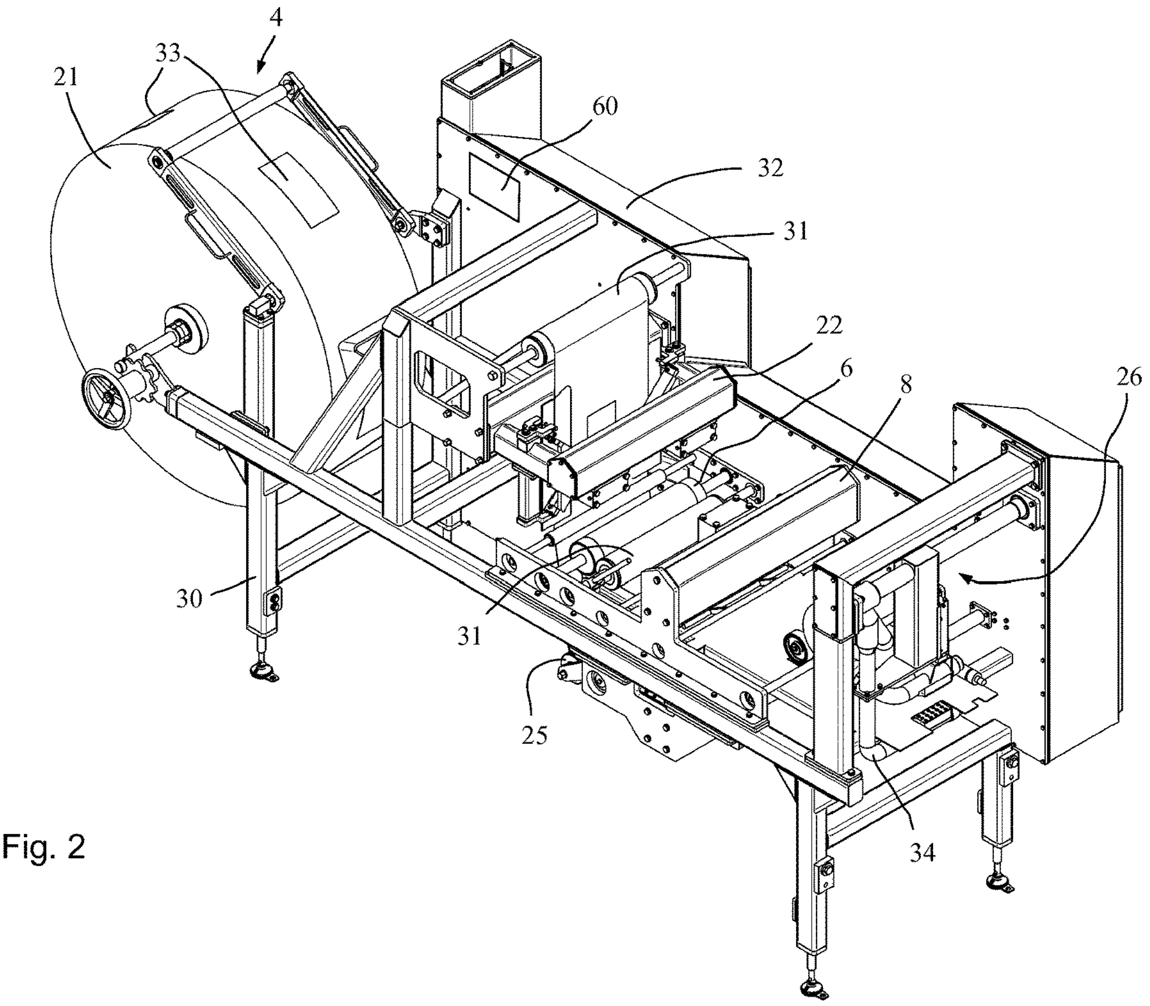
FIG. 2 a schematic perspective view of the bag manufacturing apparatus according to FIG. 1.

FIG. 2 shows a schematic perspective illustration of the bag manufacturing apparatus 1 of FIG. 1. One can readily recognize the printed elements 33 illustrated exemplarily on the roll of tubing 21 which are printed on the tubular sheet 5 of the roll of tubing 21 distanced one bag length each.

The bag film 5 is transported by means of the conveying device 6 on the conveying path 7 and deflected at the deflection roller 31. Thereafter the bag film 5 arrives at the corner seam welding device 22 which makes the corner seams or the corner welds 28 (see FIG. 4) in the bag film. Whenever it is desired. Absent corner seam welds, so-called cushion-shaped bags form after filling. Corner seam welds rather provide for box-shaped bags. In combination with readily peeling double-layer films for bag walls, bags are generated that fulfill high hygienic requirements.

Figure 3:
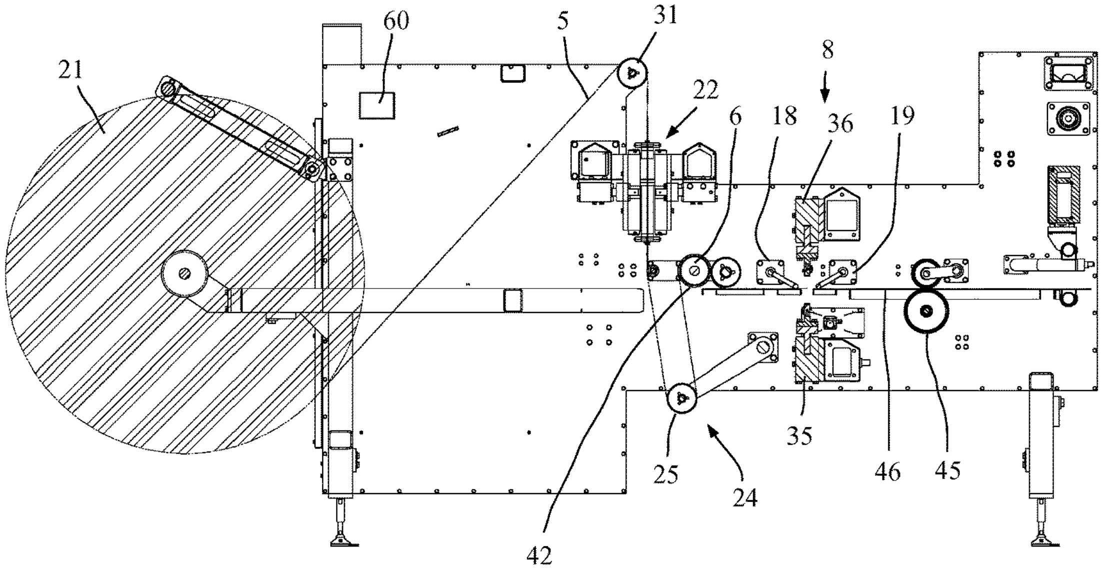
FIG. 3 a schematic cross-section of the bag manufacturing apparatus according to FIG. 2.

The conveying device 6 comprises a driven roller with which to transport the bag film 5 along the conveying path 7. Another conveying device 45 in the shape of a drive unit 45 is shown in FIG. 3.

The tensioning roll 25 of the film supply 24 is recognizable in the lower region of the bag manufacturing apparatus 1.

Following the second deflection roller 31 the bag film 5 is transported horizontally in the conveying direction of the conveying path 7 so as to transport the bag film 5 horizontally through the welding device 8. The welding device 8 makes a bottom seam 11 in the bag body 16 (see FIG. 4).

The front end of the bag manufacturing apparatus 1 shows the appending device 26 which serves to receive the open-mouth bag 2 lying at the front end and to bring it from the shown horizontal position to an appended position by pivoting about the illustrated horizontal axis. At the same time the suction devices open up the open leading edge 40 of the open-mouth bag 2 so that the open-mouth bag 2 is appended to the filling spout 110 of a filling system.

FIG. 3 shows a longitudinal section of the bag manufacturing apparatus 1 of FIG. 2. The bag film 5 unwound from the roller 21 is deflected by the deflection roller 31 and guided through the corner seam welding device 22 where corner welds 28 (FIG. 4) are made in the bag film 5 as required. After passing through the film supply 24 the conveying device 6 with the drive unit 42 follows to provide for transporting the bag film 5.

The bag film is then transported through the welding device 8, specifically far enough for the bag film to extend exactly one bag length in front of the cutting level 50 (FIG. 4) of a cutting device 12 not shown in detail. The cutting device 12 will be discussed in more detail with reference to the FIGS. 4 to 7.

Fixing means 18 and 19 serve to fix the bag film in front of and behind the welding device 8. The welding device 8 comprises welding means 9 and 10 which move toward one another and away from one another by means of cylinders 35 and 36.

FIG. 4 shows a schematic plan view of the bag film and the cutting device 12. First the bag film is advanced up to the leading edge at the illustrated head end 39. Then the bag film 5 is fixed by the fixing means 18 and 19 illustrated in FIG. 3. Thereafter the cutting device 12 is activated and presently travels transverse to the bag film 5 so that the cutting means 14 separates the bag body 16 from the bag film 5. After the cutting process the cutting device 12 is located on the other longitudinal face of the bag film 5 in the position shown in dashed lines. In the next cutting step the cutting device then travels in the opposite direction and cuts the bag film 5 by means of the cutting means 13 in the cutting level 50.

After separating the bag body 16 from the bag film 5 the bag film 5 is retracted by way of the conveying device so as to generate a distance 37 from the bottom end of the bag body 16 up to the leading edge 41 of the bag film 5. This distance 37 is dimensioned such that what is now the leading edge 41 of the bag film 5 is located outside of the longitudinal section 17. The longitudinal section 17 is defined in particular by the longitudinal overlapping of the welding means of the welding device 8 which is preferably configured as welding jaws. The interacting welding means approach one another for welding and act in the longitudinal section 17. This is where they weld together the layers of the bag film 5 lying on top of one another. Then the longitudinal section 17 is dimensioned and the bottom end 23 of the bag body 16 is disposed such that the bag film layers are completely welded together at the bottom end 23. A product-proof margin weld is produced so that there will be no non-welded excess film length whatever at the weld seam. This enables a high degree of hygiene. No particles or dirt can deposit and accumulate between an excess film length of several layers since all the layers are welded to one another product-proof up to the extreme edges.

After welding the bottom end 23 or making the bottom seam 11 the bag body 16 of the open-mouth bag 2 can be conveyed further in the direction of the filling system or alternately for example to a supply.

What is now the leading edge 41 of the bag film 5 is then conveyed further by the distance 37 plus one bag length 15 in the direction of the conveying path 7 so that the leading edge of the bag film 5 is then located in the illustrated position of the head end 39. The leading free end 41 can be prevented from hitting against the transporting surface e.g. by stop bevels, not shown. Thereafter the fixing means 18 and 19 fix the bag film 5. Thereafter the cutting device 12 separates the next bag body 16. Thereafter the front fixing means continues to fix the bag body 16 while the rear fixing means is released and the bag film 5 is retracted by the distance 37 for the next bottom end 23 to be provided with a bottom seam 11 with a product-proof margin.

At least during the cutting process the cutting device and in particular the cutting means 13 and 14 are located in the cutting level 50 which is located within the longitudinal section 17. The welding means of the welding device 8 act in the longitudinal section 17. At any rate the seam length 38 of the bottom seam 11 provides sufficient stability.

The cut-off bag body 16 is transported over the transporting surface 46 to the appending device 26 by means of the drive unit 45 (as another conveying device) (see FIG. 3).

Figure 5:
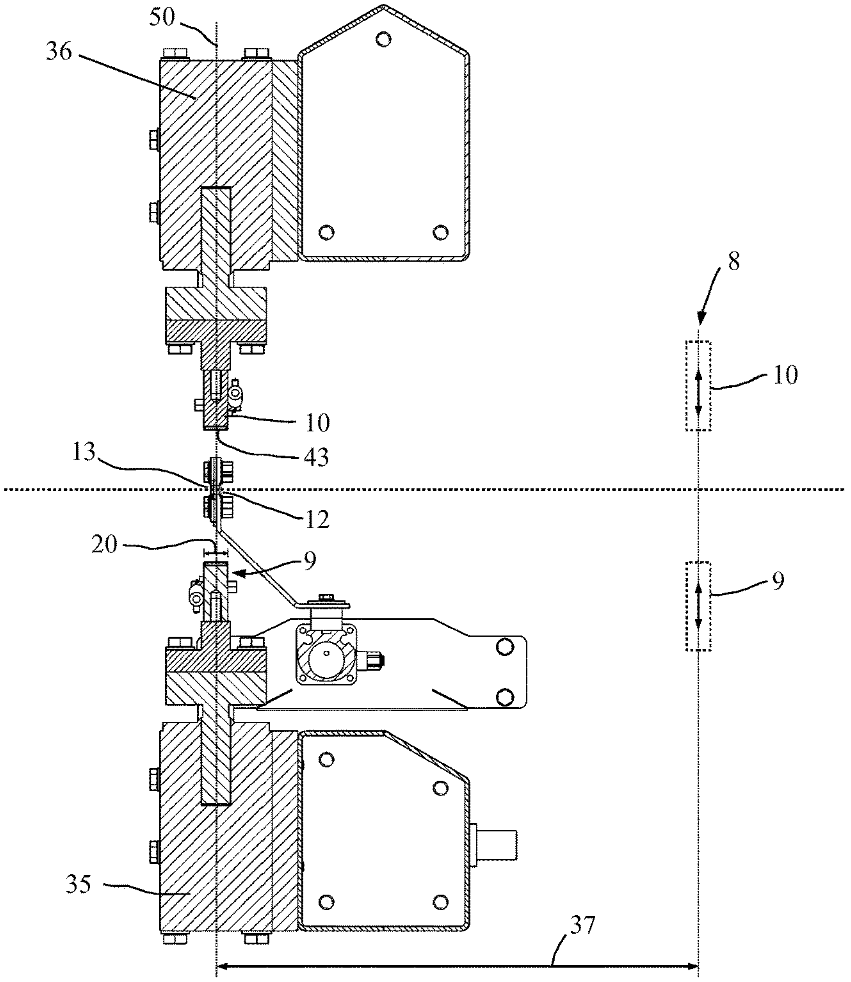
FIG. 5 a longitudinal section of the bag manufacturing apparatus according to FIG. 2 in the region of the cutting device.

FIG. 5 shows a schematic cross-section of the welding device 8 and the cutting device 12 of the bag manufacturing apparatus 1 in FIG. 2. The cylinder 35 displaces the welding jaw 9 from the illustrated spaced-apart position to a welding position, not shown, in which the welding jaws 9 and 10 immediately rest against the bag film 5 lying in-between. The length 20 of the welding means 9 and 10 defines the longitudinal section 17. The cutting level 50 is located within the longitudinal section 17. This is where the cutting means 13 and 14 are located, at least while performing a cutting process. It is also conceivable for the cutting means 13 and 14 and also the welding means 9 and 10 to be located in different levels and positions while being inactive. At any rate it is significant that a longitudinal section 17 ensues in the welding position within which the cutting level of the cutting means 13 and 14 is located.

The welding jaws 9 and 10 may for example have Teflon-coated surfaces and be applied on an insulator. Alternately it is possible to use coated welding strips or other suitable welding devices such as ultrasound, continuously heated welding jaws etc.

Alternately it is also possible to dispose the welding means 9 and 10, shown in dashed lines, of a welding device offset a specific distance 37 forwardly in the conveying direction of the film. In such a configuration the welding means 9 and 10 shown in solid lines are not necessary. After cutting the film and making a bag body by means of the cutting means 13 and/or 14 the bag body 16 is moved forwardly a predetermined or defined distance 37 (in the conveying direction or along the conveying path 7) e.g. by means of the conveying device 45 (see FIG. 3) while the bag film preferably maintains its longitudinal position. Then the welding jaws 9 and 10 shown in dashed lines make the bottom seam 11 in the bottom end 23 wherein this variant again provides for the welding means to protrude beyond the bottom end 23 during the welding. Thus, a weld seam is made in the bottom end which welds the bag body in the region of the bottom seam over its entire surface and up to the absolute bottom end 23.

Figure 6:
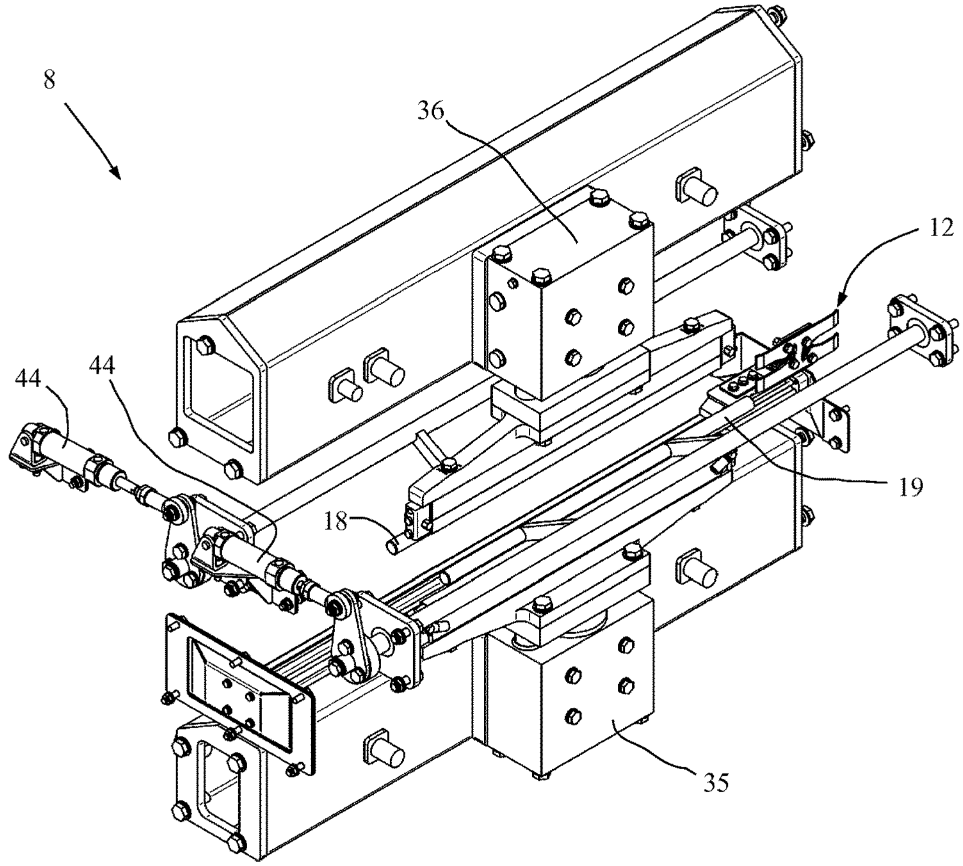
FIG. 6 a perspective view of the welding device and the cutting device of the bag manufacturing apparatus according to FIG. 2.

FIG. 6 shows a schematic perspective view of the welding device 8 and also of the fixing means 18 and 19 which are each displaceable by one of the cylinders 44 between the fixing and the released positions. One or more variable spacers or adjusting sleeves may be provided to allow pertaining settings and fine adjustment options. The fixing means 18 and 19 each comprise a linkage and a mechanism the ends of which are provided with a presently tubular fixing means for directly contacting the bag film or the bag body.

Figure 7:
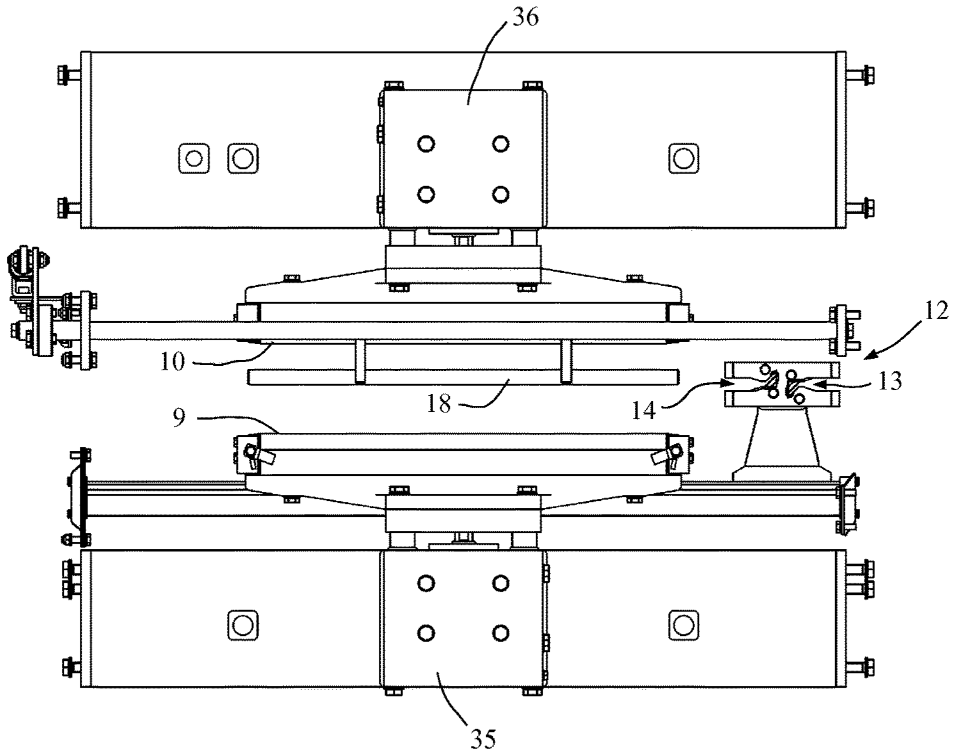
FIG. 7 a rear view of the cutting device and the welding device according to FIG. 6.

FIG. 7 shows a view of FIG. 6 wherein the cutting device 12 is again recognizable on the side that is disposed laterally traversable transverse to the longitudinal extension of the bag film 5.

On the whole the invention provides an advantageous bag manufacturing apparatus and an advantageous method for manufacturing open-mouth bags with which to achieve a high degree of hygiene. Manufacturing the bags is efficient and does not require extensive apparatus although the bags can be closed with a product-proof margin.

LIST OF REFERENCE NUMERALS

| | |
|---|---|
| 1 | bag manufacturing apparatus |
| 2 | open-mouth bag |
| 3 | storage device |
| 4 | supply |
| 5 | bag film, tubular sheet |
| 6 | conveying device |
| 7 | conveying path |
| 8 | welding device |
| 9 | welding means, welding jaw |
| 10 | welding means, welding jaw |
| 11 | bottom seam |
| 12 | cutting device |
| 13 | cutting means |
| 14 | cutting means |
| 15 | film length |
| 16 | bag body |
| 17 | longitudinal section |
| 18 | fixing means |
| 19 | fixing means |
| 20 | length of 9, 10 |
| 21 | film roll |
| 22 | corner seam welding device |
| 23 | bottom end |
| 24 | film supply |
| 25 | tensioning roll |
| 26 | appending device |
| 27 | gusset |
| 28 | corner weld |
| 30 | framework |
| 31 | deflection roller |
| 32 | control cabinet |
| 33 | imprint |
| 34 | tube |
| 35 | cylinder |
| 36 | cylinder |
| 37 | distance |
| 38 | seam length |
| 39 | head end |
| 40 | open end |
| 41 | end |
| 42 | drive unit |

-continued

| | |
|---|---|
| 43 | insulation layer |
| 44 | cylinder |
| 45 | conveying device, drive unit |
| 46 | transporting surface |
| 50 | cutting level |
| 60 | control device |
| 100 | filling system |
| 101 | high speed flow |
| 102 | low speed flow |
| 103 | hub |
| 104 | dispensing silo |
| 105 | bag removal |
| 110 | filling spout |

The invention claimed is:

1. A bag manufacturing apparatus (1) for manufacturing open-mouth bags (2), the bag manufacturing apparatus (1) comprising:
- a storage device (3) including a supply (4) of bag film (5),
- a conveying device (6) to selectively advance and retract the bag film (5) along a conveying path (7),
- a cutting device (12) including cutting means (13, 14) to separate a predetermined film length (15) of the bagfilm (5), wherein the separated predetermined film length (15) of the bag film (5) forms a bag body (16),
- a welding device (8) including welding means (9, 10) to weld a bottom seam (11) in the bag body (6) to form an open-mouth bag (2), wherein the cutting device (12) and the welding device (8) are disposed and effective in an overlapping longitudinal section (17) of the conveying path (7), and
- a control device (60) to control the conveying device (6) and the welding device (8) such that:
  - after the cutting means (13, 14) of the cutting device (12) separates the predetermined film length (15) of the bag film (5) to form the bag body (16), the control device (60) controls the conveying device (6) to retract the bag film (5) a distance (37) along the conveying path (7) away from the bag body (16), and then
  - the control device (60) controls the welding means (9, 10) of the welding device (8) to weld the bottom seam (11) in the bag body (6) after the conveying device (6) retracts the bag film (5), thereby forming the open-mouth bag (2).

2. The bag manufacturing apparatus (1) according to claim 1, wherein the welding means (9, 10) comprises welding jaws.

3. The bag manufacturing apparatus (1) according to claim 1, further comprising a fixing means (18, 19) configured-for fixing the bag film (5) in place in the conveying path (7) in front of the longitudinal section (17) and/or after the longitudinal section (17).

4. The bag manufacturing apparatus (1) according to claim 1, wherein the longitudinal section (17) is defined by a length (20) of the welding means (13, 14) along the conveying path (7).

5. The bag manufacturing apparatus (1) according to claim 1, wherein the longitudinal section (17) extends over a length of more than 5 mm.

6. The bag manufacturing apparatus (1) according to claim 1, wherein the longitudinal section (17) extends over a length between 2 mm and 50 mm.

7. The bag manufacturing apparatus (1) according to claim 1, wherein during the operation, the welding means (9, 10) extend beyond a bottom end (23) of the bag body (16) in the longitudinal direction (17) of the bag film (5).

8. The bag manufacturing apparatus (1) according to claim 1, wherein a seam length (38) of the bottom seam (11) is shorter than the longitudinal section (17).

9. The bag manufacturing apparatus (1) according to claim 1, wherein the bag film (5) is a tubular sheet and the storage device (3) comprises an accommodation for a film roll (21).

10. The bag manufacturing apparatus (1) according to claim 1, wherein the bag manufacturing apparatus (1) comprises at least one corner seam welding device (22).

11. The bag manufacturing apparatus (1) according to claim 1, wherein the bag manufacturing apparatus (1) comprises a film supply (24) including a pivot-mounted tensioning roll (25).

12. The bag manufacturing apparatus (1) according to claim 1, further comprising an appending device (26) that is for appending the open-mouth bag (2) to a filling spout (101).

13. The bag manufacturing apparatus (1) according to claim 1, wherein the longitudinal section (17) extends over a length of more than 10 mm.

14. The bag manufacturing apparatus (1) according to claim 1, wherein the longitudinal section (17) extends over a length between 5 mm and 30 mm.

15. The bag manufacturing apparatus (1) according to claim 1, wherein the cutting device (12) and the welding device (8) overlap with each other in a vertical direction.

* * * * *